(12) United States Patent
Kim et al.

(10) Patent No.: US 10,377,244 B2
(45) Date of Patent: Aug. 13, 2019

(54) BRAKING CONTROL METHOD IN REGENERATIVE BRAKING COOPERATIVE CONTROL

(71) Applicant: Hyundai Motor Company, Seoul (KR)

(72) Inventors: In Su Kim, Anyang-si (KR); Sang Hyup Lee, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 220 days.

(21) Appl. No.: 15/482,783

(22) Filed: Apr. 9, 2017

(65) Prior Publication Data

US 2018/0141441 A1 May 24, 2018

(30) Foreign Application Priority Data

Nov. 22, 2016 (KR) .......................... 10-2016-0155717

(51) Int. Cl.
| | | |
|---|---|---|
| B60L 7/26 | (2006.01) | |
| B60L 7/18 | (2006.01) | |
| B60T 8/172 | (2006.01) | |
| B60T 8/28 | (2006.01) | |
| B60T 8/32 | (2006.01) | |
| B60T 1/10 | (2006.01) | |

(Continued)

(52) U.S. Cl.
CPC ..................... *B60L 7/26* (2013.01); *B60L 7/18* (2013.01); *B60L 15/2009* (2013.01); *B60L 58/13* (2019.02); *B60T 1/10* (2013.01); *B60T 8/172* (2013.01); *B60T 8/28* (2013.01); *B60T 8/321* (2013.01); *B60L 2240/16* (2013.01); *B60L 2240/54* (2013.01); *B60L 2240/80* (2013.01); *B60L 2250/26* (2013.01); *B60T 2220/04* (2013.01); *B60T 2230/04* (2013.01); *B60T 2270/604* (2013.01)

(58) Field of Classification Search
CPC .... B60L 7/26; B60L 15/2009; B60L 11/1862; B60L 7/18; B60L 2240/16; B60L 2240/54; B60L 2240/80; B60L 2250/26; B60T 1/10; B60T 8/172; B60T 8/28; B60T 8/321; B60T 2220/04; B60T 2230/04; B60T 2270/604
See application file for complete search history.

(56) References Cited

U.S. PATENT DOCUMENTS 3,774,095 A * 11/1973 Coccia ...................... H02P 3/26
318/371
5,511,859 A * 4/1996 Kade ..................... B60W 20/13
303/3

(Continued)

FOREIGN PATENT DOCUMENTS

| JP | 2015226377 A | 12/2015 |
|---|---|---|
| JP | 2016028913 A | 3/2016 |

(Continued)

*Primary Examiner* — Mary Cheung
(74) *Attorney, Agent, or Firm* — Slater Matsil, LLP

(57) ABSTRACT

A braking control method includes steps of: (i) confirming whether to enter a blending section where regenerative braking torque is reduced and friction braking torque is increased; (ii) determining a target reduced deceleration by a controller upon entering the blending section; (iii) reducing braking torque of a vehicle in response to the determined target reduced deceleration; and (iv) returning the braking torque of the vehicle to driver's requested braking torque when the vehicle is being stopped.

20 Claims, 7 Drawing Sheets

(51) Int. Cl.
*B60L 15/20* (2006.01)
*B60L 58/13* (2019.01)

(56) References Cited

U.S. PATENT DOCUMENTS

| | | | |
|---|---|---|---|
| 2014/0257664 A1* | 9/2014 | Arbitmann | B60T 1/10 |
| | | | 701/71 |
| 2015/0202965 A1* | 7/2015 | Gabor | B60L 7/18 |
| | | | 701/70 |
| 2018/0134161 A1* | 5/2018 | Gaither | B60L 3/0076 |

FOREIGN PATENT DOCUMENTS

| KR | 100561152 B1 | 3/2006 |
|---|---|---|
| KR | 1020080024651 A | 3/2008 |
| KR | 101152013 B1 | 6/2012 |
| KR | 1020160056530 A | 5/2016 |

* cited by examiner

BRAKING CONTROL METHOD IN REGENERATIVE BRAKING COOPERATIVE CONTROL

CROSS-REFERENCE TO RELATED APPLICATIONS

This application claims under 35 U.S.C. § 119(a) the benefit of priority to Korean Patent Application No. 10-2016-0155717 filed on Nov. 22, 2016, the entire contents of which are incorporated herein by reference.

TECHNICAL FIELD

The present disclosure relates to a braking control method capable of stopping a vehicle equipped with a regenerative braking cooperative control system.

BACKGROUND

Motor driven vehicles such as hybrid vehicles and electric vehicles use regenerative braking to improve fuel efficiency. The regenerative braking system converts kinetic energy of a vehicle into electrical energy during braking of the vehicle and stores it in a battery, and uses the electric energy stored in the battery as kinetic energy of the vehicle when the vehicle travels, thereby enhancing fuel efficiency. In order to implement such a regenerative braking system, regenerative braking cooperative control technology for controlling the sum of regenerative braking torque generated in a motor during regenerative braking and friction braking torque generated in brakes to be equal to driver's request braking torque is required.

There is occurred a so-called blending section in regenerative braking cooperation control, i.e., a section in which the regenerative braking torque decreases and the friction braking torque increases. There is occurred in this blending section a phenomenon that the friction braking torque is increased due to increase of a frictional coefficient of a friction pad and hence deceleration of a vehicle is increased. The reason why this phenomenon occurs larger in regenerative braking vehicles than in ordinary vehicles is because a change in braking deceleration occurs due to a change in the friction coefficient of the pad. That is, deceleration is maintained at a constant level in a conventional brake system in which regenerative braking is not performed, as shown in FIG. 1a, while there is occurred in the regenerative braking system a blending section in which deceleration of the vehicle increases, as shown in FIG. 1b. Therefore, in the blending section, the friction braking torque increases and hence the friction coefficient of the pad increases so that the braking torque changes largely, with the result that a driver feels discomfort at the time of braking as the braking deceleration changes. The discomfort occurs more in a section where the friction braking torque increases than in a section where the friction braking torque is decreased or small.

Further, there is occurred a large change in deceleration at the time point when a vehicle stops as shown in FIG. 2. Since the occurrence of such a large change in deceleration, that is, jerk gives great discomfort to the driver, it is necessarily required to prevent the jerk phenomenon at the time of stopping the vehicle in order to improve merchantability of vehicles.

Patent Document Korean Laid-Open Patent Publication No. 10-2016-0056530 (issued on May 20, 2016) and counterpart U.S. Pat. No. 9,533,581 (issued on Jan. 3, 2017) are related to subject matter disclosed herein.

The above information disclosed in this Background section is only for enhancement of understanding of the background of the invention and therefore it may contain information that does not form the prior art that is already known in this country to a person of ordinary skill in the art.

SUMMARY

The present disclosure relates to a braking control method and, in particular embodiments, to a braking control method capable of stopping a vehicle equipped with a regenerative braking cooperative control system reducing discomfort to a driver at the time of braking. Embodiments of the present disclosure provide a braking control method, which is capable of reducing both a phenomenon that deceleration of a vehicle increases during regenerative braking cooperative control and a change in deceleration of the vehicle (i.e., jerk) occurring at the time point when the vehicle stops.

An embodiment of the present invention provides a braking control method in regenerative braking cooperative control, comprising steps of: (i) confirming whether to enter a blending section where regenerative braking torque is reduced and friction braking torque is increased; (ii) determining a target reduced deceleration by a controller upon entering the blending section; (iii) reducing braking torque of a vehicle in response to the determined target reduced deceleration; and (iv) returning the braking torque of the vehicle to driver's request braking torque when the vehicle is being stopped.

Further, there is provided a method for reducing discomfort at the time of braking in regenerative braking cooperative control, wherein in the step (ii), the target reduced deceleration is determined only when vehicle speed and deceleration are equal to or less than predetermined reference vehicle speed and reference deceleration respectively.

Further, there is provided a method for reducing discomfort at the time of braking in regenerative braking cooperative control, wherein in the step (ii), the target reduced deceleration is determined only when the driver's request deceleration is maintained stably within a predetermined preference range.

Further, there is provided a braking control method in regenerative braking cooperative control, wherein in the step (iii), a friction braking system is controlled in such a manner that friction braking torque of rear wheels is preferentially decreased and then friction braking torque of front wheels is decreased.

Further, there is provided a braking control method in regenerative braking cooperative control, wherein in the step (iii), when the target reduced deceleration is not satisfied with decrement of the friction braking torque of the front and rear wheels, regenerative braking torque is decreased according to a state of charge (SOC) of a battery.

Further, there is provided a braking control method in regenerative braking cooperative control, wherein control is performed in such a manner that the regenerative braking torque is decreased in response to the target reduced deceleration when the SOC of the battery exceeds a predetermined reference SOC whereas the regenerative braking torque is not decreased when the SOC of the battery is equal to or less than the predetermined reference SOC.

Further, there is provided a braking control method in regenerative braking cooperative control, wherein in the step (iv), it is determined whether a predetermined waiting time has elapsed after the vehicle has stopped and if the waiting time has elapsed, the braking torque is returned to the driver's request braking torque.

Further, there is provided a braking control method in regenerative braking cooperative control, wherein in the step (iv), the braking torque is constantly increased to return to the driver's request braking torque.

In another embodiment, the present invention provides a brake controller for use with a vehicle. The brake controller includes a processor and a non-transitory computer-readable storage medium storing code to be executed by the processor. The program includes instructions for a braking control method in regenerative braking cooperative control. The method includes confirming whether to enter a blending section where regenerative braking torque is reduced and friction braking torque is increased, determining a target reduced deceleration by a controller upon entering the blending section, reducing braking torque of a vehicle in response to the determined target reduced deceleration. and returning the braking torque of the vehicle to a driver's requested braking torque when the vehicle is being stopped.

In yet another embodiment, the present invention provides a vehicle that includes a drive motor, a battery coupled to the drive motor to supply power to the drive motor, a differential gear, and vehicle wheels operatively coupled to the differential gear. The drive motor, battery, differential gear and vehicle wheels are configured so that a rotational force generated from the drive motor by the battery is transmitted to the vehicle wheels via the differential gear. A braking system is coupled to the vehicle wheels and a controller is configured to control the braking system. The controller is configured to confirm whether to enter a blending section where regenerative braking torque is reduced and friction braking torque is increased, determine a target reduced deceleration by a controller upon entering the blending section, reduce braking torque of the vehicle in response to the determined target reduced deceleration, and return the braking torque of the vehicle to a driver's requested braking torque when the vehicle is being stopped.

The braking control method in regenerative braking cooperative control according to preferred embodiments of the present invention has the following effects.

First, increase of deceleration occurring in the blending section upon regenerative braking cooperative control is prevented, thereby eliminating discomfort that a driver may feel at the time of braking.

Second, it is possible to reduce a sudden change (i.e., jerk) of deceleration to be generated when a vehicle is being stopped, thereby enhancing merchantability of a vehicle.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1A:
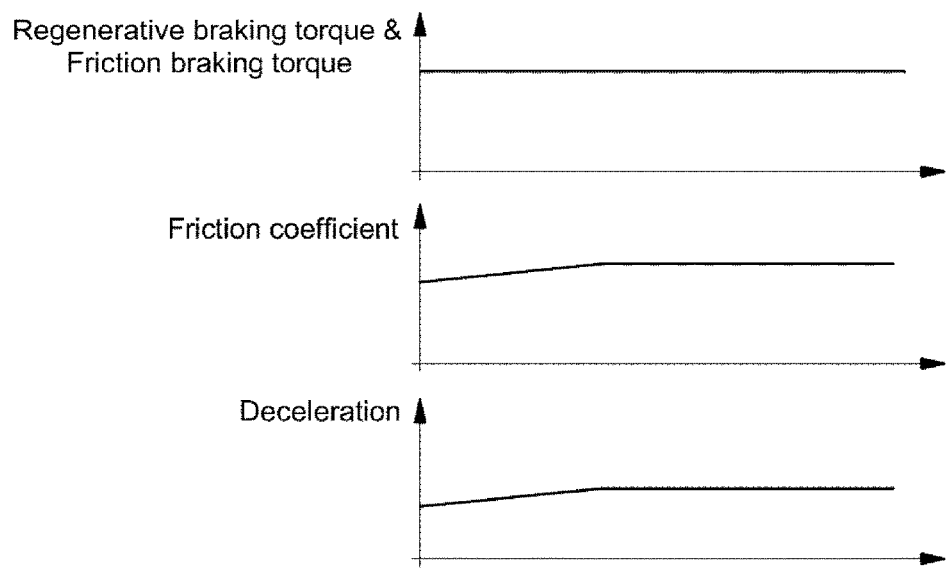
FIG. 1a shows changes in braking torque, friction coefficient and deceleration in a general braking system without regenerative braking.
Figure 1B:
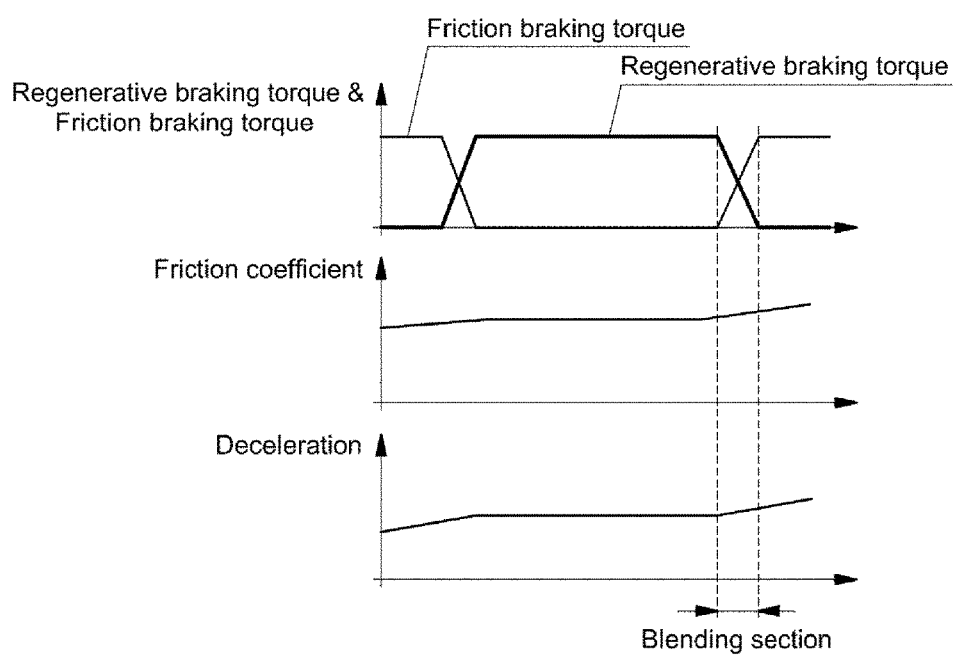
FIG. 1b shows changes in braking torque, friction coefficient and deceleration according to times in a regenerative braking system.
Figure 2:
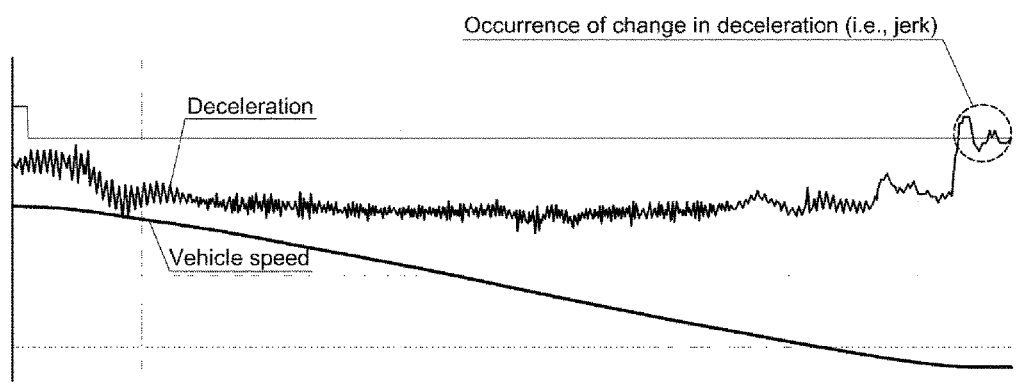
FIG. 2 is a graph showing that a change in deceleration occurs at the time point when a vehicle is being stopped.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to a braking control method for reducing discomfort that a driver feels due to a phenomenon that deceleration of a vehicle increases during regenerative braking cooperative control and a change in deceleration of the vehicle occurring at the time point when the vehicle stops.

Particularly, the present invention provides a technology which is characterized in that braking is performed stably in a blending section in which regenerative braking torque is replaced with friction braking torque while a vehicle is being stopped, that is, discomfort that a driver feels at the time of braking due to a change in braking deceleration is appropriately reduced to perform braking stably.

Hereinafter, a braking control method at the time of the regenerative braking cooperative control according to a preferred embodiment of the present invention will be described in detail with reference to the accompanying drawings.

Figure 3:
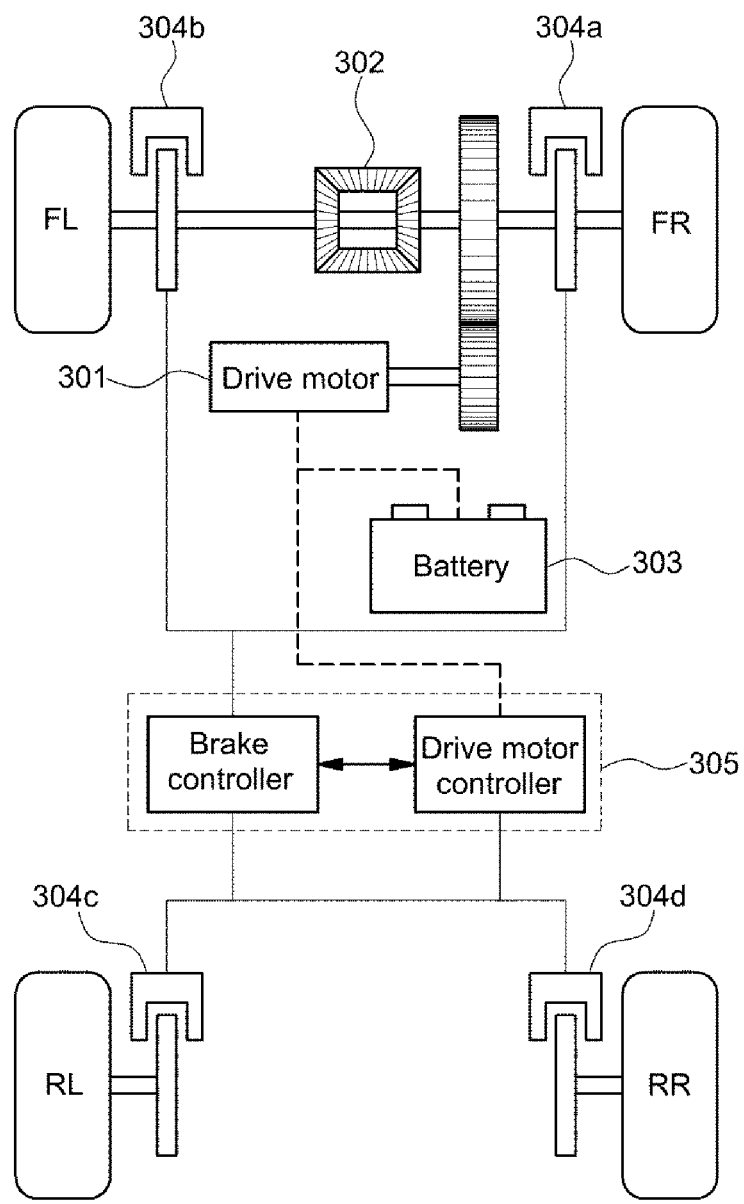
FIG. 3 is a block diagram illustrating a vehicle in which regenerative braking cooperative control is performed.

FIG. 3 is a block diagram illustrating a vehicle in which the regenerative braking cooperative control is performed.

A vehicle to which the preferred embodiment of the present invention is applied is a vehicle in which regenerative braking is performed, wherein the vehicle comprises a drive motor 301 and a battery 303 for supplying power to the drive motor. Rotational force generated from the drive motor by the battery is transmitted to vehicle wheels via a differential gear 302. Each of the vehicle wheels is provided with calipers 304a, 304b, 304c, and 304d for braking. Preferably, a hydraulic line that transmits hydraulic pressure so as to generate braking torque in each of the calipers is formed.

In addition, a brake controller for controlling a braking system including a caliper, a disk and a hydraulic line may be comprised in the vehicle and a drive motor controller for controlling the drive motor may be comprised in the vehicle. These controllers may be installed separately or integrally, which are herein collectively referred to as a controller 305. Therefore, the term controller 305 as stated herein is defined as collectively referring to a controller that performs control over the entire vehicle including a braking system.

The controller 305 can be implemented in a number of ways. For example, known hardware can be controlled using any control circuitry, for example, a microcontroller or digital logic circuitry implemented, for example, in an application specific integrated circuit (ASIC). For example, the controller 305 could include a processor and a non-transitory computer-readable storage medium storing code (e.g., software) to be executed by the processor. The controller 305 could also be implemented in digital logic, e.g., utilizing a state machine.

Further, although the hydraulic braking system is described herein as an example comprising a caliper which is hydraulically controlled by a hydraulic actuator, the present invention is not limited to this hydraulic braking system but may also comprise other types of braking systems having a cooperative control system of regenerative braking including a blending section between regenerative braking and friction braking. The present invention may be applied to, for example, a braking system including an electronic brake.

A preferred embodiment of the present invention adopts a manner of decreasing a target braking torque of the vehicle as a method for reducing discomfort at the time of braking in the blending section. Accordingly, the target braking deceleration of the vehicle is reduced in accordance with a prescribed manner, and in this specification, setting the target braking torque reduced compared to driver's request torque and performing braking control based on the reduced target braking torque by the controller are herein referred to as soft stop braking (SSB).

Figure 4:
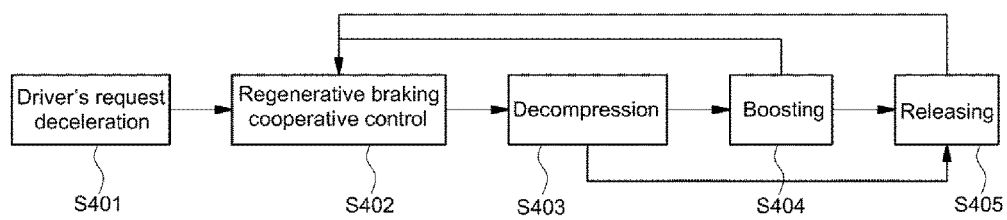
FIG. 4 illustrates basic steps of soft stop braking performed at the time of braking control through regenerative braking cooperative control, according to a preferred embodiment of the present invention.

Specific steps of this soft stop braking are shown in FIG. 4.

As shown in FIG. 4, a braking control method at the time of the regenerative braking cooperative control according to the present invention takes driver's request deceleration determined according to the driver's braking intent as input. The regenerative braking cooperative control is performed according to the driver's request deceleration wherein the soft stop braking is applied in a specific blending section in the process of the regenerative braking cooperative control. In particular, the soft stop braking functions in the blending section where regenerative braking torque decreases and friction braking torque increases.

As described above, since increase of vehicle deceleration and a sudden change in the vehicle deceleration (i.e., jerk) occur in this blending section, the soft stop braking is applied to solve this problem, i.e., discomfort at the time of braking.

Preferably, the soft stop braking is applied when speed and deceleration of the vehicle are equal to or less than a certain value respectively and driver's request deceleration (which is measured from a brake pedal stroke, pressure of master cylinder, etc.) is constant. Setting conditions for speed and deceleration of the vehicle is to accurately determine driver's braking intent. If the driver brakes suddenly, speed and deceleration of the vehicle will be relatively large. In this case, it is more preferable to maximize braking performance in accordance with the driver's demand rather than to avoid discomfort at the time of braking. Therefore, when speed and deceleration of the vehicle are larger than a predetermined value respectively, it is considered to be a situation that sufficient braking performance is required and therefore, it is more preferable to not apply the soft stop braking as in the present invention. On the other hand, if speed and deceleration of the vehicle are relatively small, it can be determined as a situation that the vehicle is being stopped slowly and therefore, the soft stop braking is applied to reduce braking torque.

Further, in addition to this condition of vehicle speed and deceleration, an amount of change in the request deceleration can be also considered. Therefore, when the driver's request deceleration is maintained stably within a predetermined reference range, for example, when the request deceleration varies stably within a range of 5%, this is considered to be a case of the vehicle being stopped slowly and therefore, the soft stop braking can be applied.

The system is configured such that during the soft stop braking, an amount of friction braking torque reduction is calculated through a controller to reduce hydraulic pressure.

Therefore, during such soft stop braking control, torque reduced as indicated below is applied, and distributed to friction braking torque and regenerative braking torque.

Friction braking torque+Regenerative braking torque=Driver's request torque−Reduction torque of SSB On the other hand, the soft stop braking is subjected to steps of decompressing, boosting and releasing of pressure, as shown in FIG. 4. In this case, the decompressing means a process of reducing braking torque in response to the decreased torque of SSB, while the boosting means a process of restoring braking torque according to the driver's request torque without applying a decrement of the braking torque. Further, the releasing means releasing the soft stop braking control.

Figure 5:
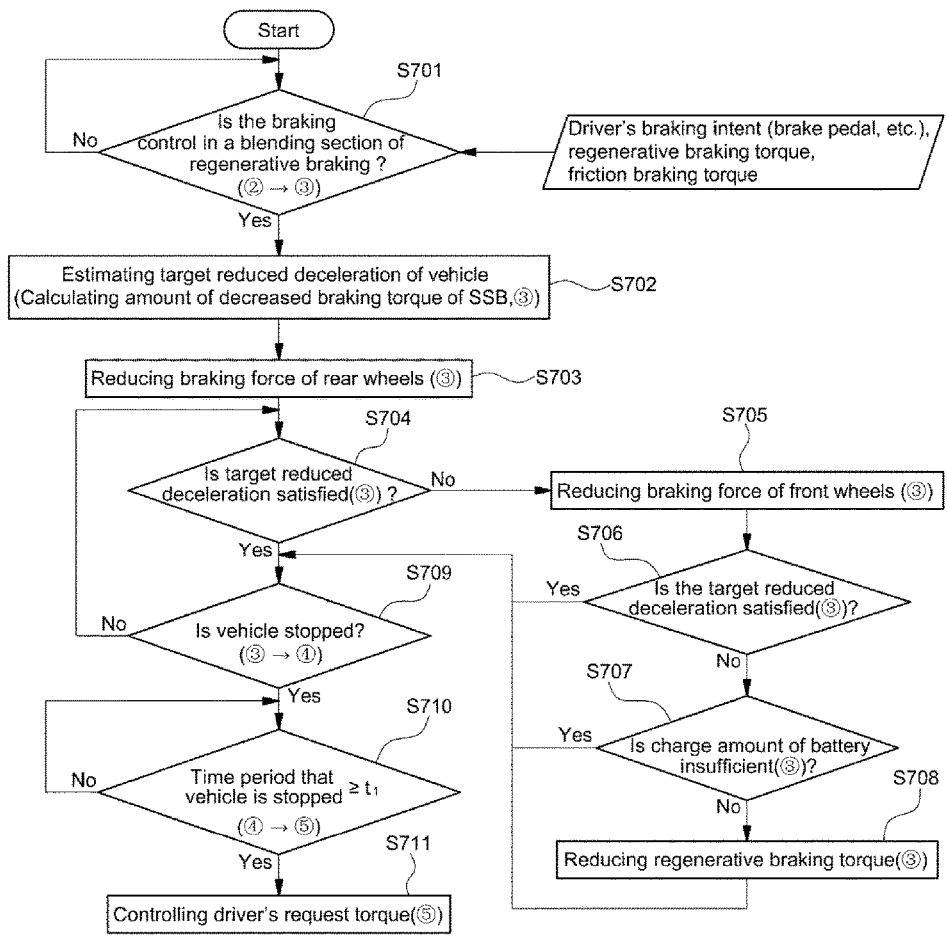
FIG. 5 illustrates each step of braking control at the time of regenerative braking cooperative control, according to a preferred embodiment of the present invention.
Figure 6:
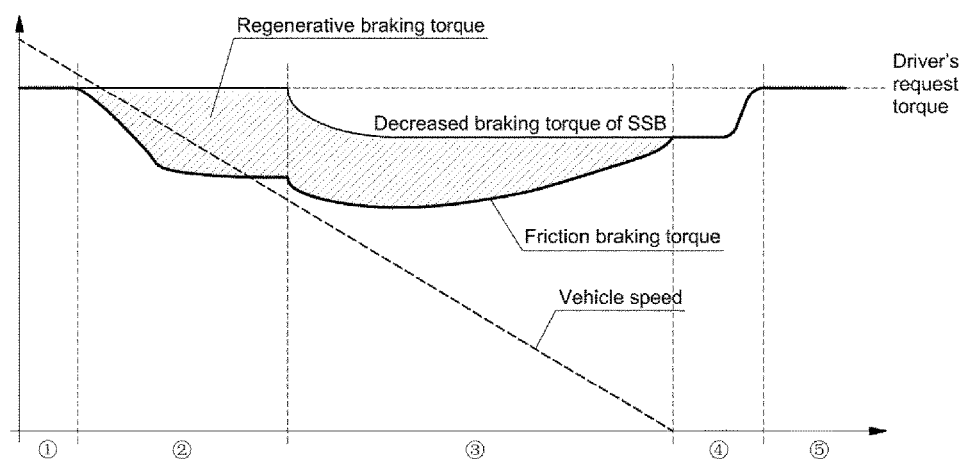
FIG. 6 is a graph showing a change in braking torque and vehicle speed according to a preferred embodiment of the present invention.

On the other hand, the braking control method at the time of the regenerative braking cooperative control including such soft stop braking control is shown in detail in FIG. 5. Further, change in braking torque and vehicle speed with respect to time according to the braking control method in the regenerative braking cooperation control of FIG. 5 is shown in FIG. 6.

In a case of the braking control method in the regenerative braking cooperative control according to the present invention as shown in FIG. 5, it is preferentially identified whether to be in the blending section according to the regenerative braking cooperative control. Here, the blending section means a section in which the regenerative braking torque is replaced with the friction braking torque while the regenerative braking torque is reduced and the friction braking torque is increased.

In step S701, information such as driver's braking intent inputted from a brake pedal and the like, regenerative braking torque and friction braking torque is collected in the controller, and it is determined whether to proceed with the next step based on the collected information. In this case, information such as vehicle speed, deceleration, brake pedal stroke, pressure of the master cylinder, etc. can be used as described above.

If it is determined that the braking control is in the blending section, the amount of the friction braking torque reduction is calculated based on preset logic of soft stop braking and then the braking control is performed accordingly.

Determining whether the braking control is in the blending section is performed under the state that the regenerative braking is performed, i.e., in a section ② of FIG. 6 where the regenerative braking is performed. On the other hand, if the blending section is identified, the total braking torque is forced to be reduced by applying the decreased torque of SSB, which corresponds to a section ③ in FIG. 6. The decreased torque of SSB refers to torque to decrease in the soft stop braking control. Since the decreased torque of SSB is proportional to deceleration to be reduced, it is preferably configured to determine a target reduced deceleration and thus the decreased torque of SSB.

Such a target reduced deceleration can be set to a value tuned by information such as the current vehicle behavior, the driver's request braking torque, etc.

In this regard, gradient of the decreased torque of SSB can be determined by PI control in which a value obtained by multiplying an error from the current deceleration of the vehicle to the request deceleration (i.e., tuned value), i.e., a difference between the current deceleration and the target deceleration, by a constant gain is added to a value obtained by multiplying the sum of the errors by a constant gain to reduce an amount of friction braking torque in order to satisfy the target deceleration.

In this case, the decreased torque of SSB is proportional to the reduced deceleration and the current reduced deceleration can be estimated as follows:

$$\text{Reduced Deceleration (Present)}=1/(\tau S+1) \times \text{Reduced Deceleration (Time Point of Intervention of SSB)}$$

On the other hand, it may be configured such that when the braking intent of the driver, which is identified from input such as a brake pedal stroke, changes during braking, the soft stop braking is released.

If the target reduced deceleration of the vehicle or the decreased torque of SSB is estimated through step S702, a step of reducing the braking torque based on the estimated value is performed.

Reduction of the braking torque is performed in a manner of hydraulic pressure control performed such that deceleration of the vehicle is reduced by the target reduced deceleration, or the friction braking torque is decreased as much as the predetermined decreased torque of SSB.

In this case, two rear wheels RR and RL are preferentially controlled simultaneously to reduce deceleration of the vehicle to the target deceleration without decreasing stability of the vehicle. However, if both rear wheels cannot be controlled simultaneously in an aspect of hardware, hydraulic pressure of the wheels may be reduced one by one.

On the other hand, if the target reduced deceleration is not satisfied even by reducing the hydraulic pressure of the rear wheels, braking torque of front wheels is forced to be reduced. Further, if the target reduced deceleration is not satisfied even though friction braking torque of the front and rear wheels is reduced, reduction of the regenerative braking torque is additionally considered. However, in the present invention, a state of charge (SOC) of a battery is preferentially considered to determine whether to perform regeneration, thereby enhancing energy efficiency and ensuring durability of the battery. That is, the regenerative braking torque is controlled to be reduced when the SOC of the battery is sufficient in view of the rate of energy regeneration, while the regenerative braking torque is controlled not to be reduced when the SOC of the battery is insufficient.

Therefore, during the soft stop braking, the decreased torque is applied in the order of rear wheels, front wheels, and regenerative braking.

This is specifically shown in steps S703 to S708 in FIG. 5.

That is, the braking torque of the rear wheels is preferentially reduced through the step of reducing braking force of the rear wheels in step S703 and it is confirmed whether the target reduced deceleration (or the decreased torque of SSB) is satisfied in step S704. Thereafter, if the target reduced deceleration (or the decreased torque of SSB) is not satisfied, braking force of the front wheels is reduced in step S705, and it is confirmed again whether the target reduced deceleration (or the decreased torque of SSB) is satisfied in step S706. If the target reduced deceleration (or the decreased torque of SSB) is not satisfied even though the braking force of the front wheels is reduced, it is determined whether the charge amount of the battery from the SOC of the battery is insufficient in step S707. As a result, if the SOC of the battery is below a reference value, that is, when it is determined that the charge amount of the battery is insufficient, the regenerative braking torque is controlled not to be reduced, whereas if it is determined that the SOC of the battery exceeds the reference value and hence the charge amount of the battery is sufficient, the regenerative braking torque is controlled to be reduced to satisfy the target reduced deceleration (or the decreased torque of SSB) in step S708.

Next, if a decompression step for reducing the braking torque in response to the target reduced deceleration (or the decreased torque of SSB) is finished, a pressure boosting step in which the braking torque is returned to the level of the driver's request braking torque is performed again.

This pressure boosting step takes place at the time when the vehicle is completely stopped. This is because even if the friction braking torque is increased after the vehicle has stopped, it does not influence a change in deceleration of the vehicle. Therefore, according to this embodiment, when the vehicle stops, that is, when the vehicle speed becomes zero, pressure is boosted up to the driver's request braking torque after a predetermined time elapses. This step of boosting the pressure is shown in a section ④ of FIG. 6.

Figure 7:
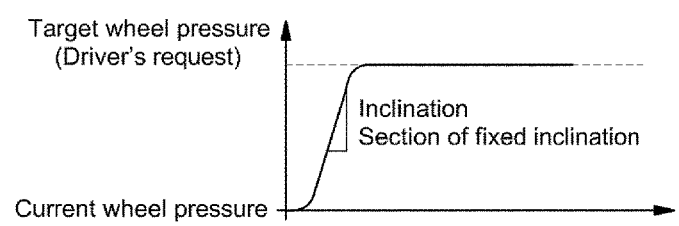
FIG. 7 shows a method of boosting pressure of wheels for increasing braking torque when a vehicle is being stopped.

FIG. 7 shows in detail a method of boosting pressure of wheels for increasing braking torque when a vehicle is stopped in such a step of boosting pressure. In other words, in order to minimize the driver's sense of heterogeneity of brake pedal operation in the step of boosting pressure, inclination where pressure of wheels is boosted is controlled to be fixed such that the rate of fluctuation of hydraulic pressure of the wheels is minimized, as shown in FIG. 7.

On the other hand, when the driver's request braking torque is changed in the section of boosting pressure, the soft stop braking control is no longer applied and the braking control is changed to the normal regenerative braking cooperative control mode.

In this step of boosting pressure, it may be configured to perform boosting of pressure after the vehicle is completely stopped and then the predetermined waiting time elapses, wherein the waiting time is preferably set to such a time period that no jerk occurs. In this case, it is preferable that the waiting time is set in consideration of a change in deceleration of the vehicle after the vehicle is stopped, that is, a time period during which the jerk disappears completely. The reason for setting the waiting time in this way is to prevent a situation that when the jerk due to a change in deceleration of the vehicle and repulsion of the brake pedal are added, a sense of incongruity of the pedal occurs and therefore the driver performs an unnecessary pedal operation.

Therefore, after confirming whether the vehicle is stopped as in step S709, if it is determined that the predetermined waiting time t1 after the vehicle is stopped elapses in step S710, the control proceeds to step S711 where the braking torque is formed in response to the driver's request torque (see section ⑤ in FIG. 6).

Although the present invention has been described with reference to preferred embodiments, it will be apparent by those who have ordinary skill in the art that modifications and changes to elements of the present invention may be made without departing from the spirit and scope of the present invention as defined in the appended patent claims. Further, many modifications may be made to specific situations or materials without departing the principle scope of the present invention. Therefore, the present invention is not limited to the detailed description of the preferred embodiments of the present invention, but includes all embodiments within the scope of the appended patent claims.

What is claimed is:

1. A braking control method in regenerative braking cooperative control, the method comprising:
   confirming whether to enter a blending section where regenerative braking torque is reduced and friction braking torque is increased;
   determining a target reduced deceleration by a controller upon entering the blending section, the target reduced deceleration being determined only when vehicle speed is less than or equal to a predetermined reference vehicle speed and when vehicle deceleration is less than or equal to a predetermined reference deceleration;
   reducing braking torque of a vehicle in response to the determined target reduced deceleration; and
   returning the braking torque of the vehicle to a driver's requested braking torque when the vehicle is being stopped.

2. The method of claim 1, wherein determining the target reduced deceleration comprises determining the target reduced deceleration only when the driver's requested deceleration is maintained stably within a predetermined reference range.

3. The method of claim 1, wherein reducing the braking torque of the vehicle comprises controlling a friction braking system in such a manner that friction braking torque of rear wheels is preferentially decreased and then friction braking torque of front wheels is decreased.

4. The method of claim 3, wherein reducing the braking torque of the vehicle comprises decreasing regenerative braking torque according to a state of charge (SOC) of a battery when the target reduced deceleration is not satisfied with a decrement of the friction braking torque of the front and rear wheels.

5. The method of claim 4, wherein reducing the braking torque of the vehicle comprises performing control in such a manner that the regenerative braking torque is decreased in response to the target reduced deceleration when the SOC of the battery exceeds a predetermined reference SOC whereas the regenerative braking torque is not decreased when the SOC of the battery is equal to or less than the predetermined reference SOC.

6. The method of claim 1, wherein returning the braking torque of the vehicle to the driver's requested braking torque comprises determining whether a predetermined waiting time elapses after the vehicle stops and when the waiting time elapses, returning the braking torque to the driver's requested braking torque.

7. The method of claim 1, wherein returning of the braking torque of the vehicle to the driver's requested braking torque comprises constantly increasing the braking torque to return to the driver's requested braking torque.

8. A brake controller for a vehicle, the brake controller comprising:
   a processor; and
   a non-transitory computer-readable storage medium storing code to be executed by the processor, the code including instructions for a braking control method in regenerative braking cooperative control, the method comprising:
      confirming whether to enter a blending section where regenerative braking torque is reduced and friction braking torque is increased;
      determining a target reduced deceleration by a controller upon entering the blending section;
      reducing braking torque of the vehicle in response to the determined target reduced deceleration; and
      returning the braking torque of the vehicle to a driver's requested braking torque when the vehicle is being stopped, wherein returning the braking torque of the vehicle to the driver's requested braking torque comprises determining whether a predetermined waiting time elapses after the vehicle stops and when the waiting time elapses, returning the braking torque to the driver's requested braking torque.

9. The brake controller of claim 8, wherein determining the target reduced deceleration comprises determining the target reduced deceleration only when vehicle speed is less than or equal to a predetermined reference vehicle speed and when vehicle deceleration is less than or equal to a predetermined reference deceleration.

10. The brake controller of claim 9, wherein determining the target reduced deceleration comprises determining the target reduced deceleration only when the driver's request deceleration is maintained stably within a predetermined reference range.

11. The brake controller of claim 8, wherein reducing the braking torque of the vehicle comprises controlling a friction braking system in such a manner that friction braking torque of rear wheels is preferentially decreased and then friction braking torque of front wheels is decreased.

12. The brake controller of claim 11, wherein reducing the braking torque of the vehicle comprises decreasing regenerative braking torque according to a state of charge (SOC) of a battery when the target reduced deceleration is not satisfied with a decrement of the friction braking torque of the front and rear wheels.

13. The brake controller of claim 12, wherein reducing the braking torque of the vehicle comprises performing control in such a manner that the regenerative braking torque is decreased in response to the target reduced deceleration when the SOC of the battery exceeds a predetermined reference SOC whereas the regenerative braking torque is not decreased when the SOC of the battery is equal to or less than the predetermined reference SOC.

14. The brake controller of claim 8, wherein returning of the braking torque of the vehicle to the driver's requested braking torque comprises constantly increasing the braking torque to return to the driver's requested braking torque.

15. A vehicle comprising:
a drive motor;
a battery coupled to the drive motor to supply power to the drive motor;
a differential gear;
vehicle wheels operatively coupled to the differential gear, wherein the drive motor, battery, differential gear and vehicle wheels are configured so that a rotational force generated from the drive motor by the battery is transmitted to the vehicle wheels via the differential gear;
a braking system coupled to the vehicle wheels;
a controller configured to control the braking system, the controller configured to:
confirm whether to enter a blending section where regenerative braking torque is reduced and friction braking torque is increased;
determine a target reduced deceleration upon entering the blending section, the target reduced deceleration being determined only when vehicle speed is less than or equal to a predetermined reference vehicle speed and when vehicle deceleration is less than or equal to a predetermined reference deceleration;
reduce braking torque of the vehicle in response to the determined target reduced deceleration; and
return the braking torque of the vehicle to a driver's requested braking torque when the vehicle is being stopped.

16. The vehicle of claim 15, wherein the braking system comprises a caliper, a disk and a hydraulic line.

17. The vehicle of claim 15, wherein the controller comprises a brake controller configured to control the braking system and a drive motor controller configured to control the drive motor.

18. The vehicle of claim 15, wherein the controller comprises a processor and a non-transitory computer-readable storage medium storing code to be executed by the processor.

19. The vehicle of claim 15, wherein the controller is configured to return the braking torque of the vehicle to the driver's requested braking torque by determining whether a predetermined waiting time elapses after the vehicle stops and, when the waiting time elapses, returning the braking torque to the driver's requested braking torque.

20. The vehicle of claim 15, wherein the controller is configured reduce the braking torque of the vehicle by controlling a friction braking system in such a manner that friction braking torque of rear wheels is preferentially decreased and then friction braking torque of front wheels is decreased.

* * * * *